Patented Jan. 16, 1951

2,538,024

UNITED STATES PATENT OFFICE 2,538,024

BETA-CYANOETHYL DERIVATIVES OF AMINO ACIDS AND PROCESS FOR PREPARING THEM

Leonard L. McKinney, John C. Cowan, and Eugene H. Uhing, Peoria, Ill., assignors to the United States of America as represented by the Secretary of Agriculture No Drawing. Application March 29, 1949, Serial No. 84,257

16 Claims. (Cl. 260—465)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the cyanoethyl derivatives of alpha amino acids and to a method for the preparation of these compounds. The invention has among its objects the provision of these derivatives as a new class of chemical compounds, and moreover their preparation by the reaction of acrylonitrile with amino acid salts.

The products of this invention have the following general structural formulae:

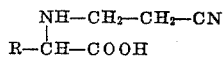

and

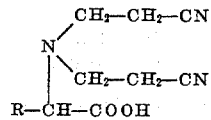

in which R is the residual group of the alpha-amino acids in any of their optical isomeric or their racemic forms.

The new compounds are in general white crystalline solids, useful as intermediates in the production of pharmaceuticals, synthetic resins, artificial fibers, plastics, plasticizers, insecticides and other products.

These compounds are produced by the reaction of acrylonitrile with amino acid salts such as the alkali metal salts, alkaline earth metal salts, ammonium salts or quaternary ammonium salts. The reaction may be carried out at atmospheric pressures and room temperatures or lower, up to the reflux temperature of the reaction mixture. It may also be carried out employing superatmospheric pressures and correspondingly higher temperatures. The reaction occurs so readily that one molecular equivalent of acrylonitrile reacts to produce the monocyanoethyl derivatives in nearly quantitative yield. The dicyanoethyl derivatives are obtained by employing two or more molecular equivalents of acrylonitrile.

The reaction is preferably carried out in an aqueous medium, although the process can be successfully carried out by merely bringing the two reactants into chemical contact as by refluxing the acrylonitrile with the salt of the amino acid.

These reactions are easily followed by titration curves because the addition of the beta-cyanoethyl group depresses the ionization of the amino group in somewhat the same manner as formaldehyde.

In the structural formulae given above R may represent an aliphatic, araliphatic, or an aromatic group. It may also be heterocyclic as for example in the cyanoethylated derivatives of tryptophane and histidine. The amino acids used in the process of the invention may be naturally occurring or synthetically produced alpha-amino acids. Moreover, the acids may be in any of their optical isomeric forms or in racemic mixtures. In this application the terms "structural formula of a naturally occurring alpha amino acid of proteins" does not necessarily mean the special arrangement of the atoms in three dimensions. We may use acids in isolated and purified form, or mixtures of the acids with small amounts of impurities or even mixtures of unisolated amino acids, such as for example, protein hydrolysates.

The reaction may be carried out on protein hydrolysates or a fraction of the hydrolysates, such as is obtained as a byproduct in monosodium glutamate manufacture. Cyanoethylation of the amino acids change their physical and chemical properties to such an extent that their separation from the hydrolysate is facilitated. The presence of the nitrile group in the derivatives of this invention increases the functionality of the amino acid. The nitrile groups may be converted into carboxyl, amino, amide, ester, or other functional groups by known methods.

Acrylonitrile is known to react with a variety of organic compounds. Hoffmann and Jacobi, in U. S. Patent No. 1,992,615, teach the reaction of acrylonitrile with "ammonia bases" and mention aminoacetic acid as an exemplary ammonia base. The patentees fail to describe any reaction or reaction product in particular which involves the cyanoethylation of aminoacetic acid. Insofar as applicants are aware, no one has described such a product prior to this invention. In fact, we have discovered that the processes disclosed by the patentees are not suitable for the production of their compounds. Although, under some of the reaction conditions disclosed by Hoffman and Jacobi, aminoacetic acid reacts with small equivalent properties of acrylonitrile, no cyanoethyl derivative has been isolated from the reaction mixture.

Basic catalysts, such as sodium alkoxide or sodium hydroxide, have been used to accelerate the reaction of acryolintrile with compounds, such as alcohols, amines, and certain ketones. We have found in the cyanoethylation of amino acids that the presence of catalytic or minor amounts of bases are ineffective for satisfactory promotion of the reaction. For example, glycine may be refluxed with excess acryolintrile for prolonged periods of time in the presence of catalytic amounts of sodium methoxide, and no reaction occurs. When small amounts of sodium hydroxide or Triton B (trimethyl benzl ammonium hydroxide) are used, equivalent small amounts of acrylonitrile reacts. For example, when an aqueous solution of glycine, containing 0.1 equivalent of base, is shaken with 1 equivalent of acrylonitrile 0.1 equivalent of acrylonitrile reacts. We have discovered that the alkali metal or other salts of alpha amino acids react readily with acrylonitrile to give good yields of the cyanoethyl derivatives. The salts of the amino acids may be prepared in situ by reacting the free amino acid with an equivalent amount of alkali, or they may be prepared separately.

The above facts indicate that the effect of the alkali in the case of alpha amino acids is not so much catalytic as it is purely chemical. The formation of the salt effects splitting the "zwitter ion" complex between the amino group and the carboxyl group, thus freeing the amino group. Moreover, we have found no advantage in employing alkali in excess of that required to obtain the salt of the amino acid. In fact, the amount of acrylonitrile reacting is often considerably reduced if substantially more than an equivalent amount of alkali is used. It is to be understood, however, that minor excesses of alkali are of no great disadvantage.

The process as described above results in the direct production of the corresponding cyanoethylated amino acid salt derivative. This may be recovered from the reaction mixture, as for example by evaporation. The free acid of the derivatives may be obtained by neutralizing with an equivalent amount of acid and separating the free acid from the salt, as for example by crystallization. If the neutralization is carried out with a mineral acid, the corresponding acid salts of the amine may be obtained by using an excess of mineral acid. If an organic acid is used, the acid salts of the amines do not form in aqueous solution, and an excess may be employed to produce the free acid. In the case of the acidic amino acids, such as glutamic and aspartic, the neutralization is preferably carried out with mineral acid.

The following examples are illustrative of the invention.

*Example 1*

N-(2-cyanoethyl)-glycine.—One mole of glycine (75.03 gm.) was shaken with 200 ml. of water. One mole of sodium hydroxide dissolved in 200 ml. of water was added to give a solution of sodium glycinate. One mole of acrylonitrile (53.06 gm.) was added slowly with stirring and the reaction mixture was allowed to stand for 18 hours at room temperature with occasional shaking. At the end of 18 hours the mixture was heated at 50° C. for 1 hour and acidified with 1 mole of hydrochloric acid. Analysis indicated that 0.95 mole of acrylonitrile had reacted. Two volumes of 95 percent ethyl alcohol were added to the salt mixture and a mass of needle-like crystals began to form immediately. After standing over night at 5° C., the crystals were filtered off and washed with 80 percent ethyl alcohol solution to give 71 gms. of the desired product. Analysis: calc.: C, 46.86; H, 6.26; N, 21.88; found: C, 46.5; H, 6.05; N, 21.89. Melting point: 190–191° C. The analysis agrees with the formula for N-(2-cyanoethyl)-glycine:

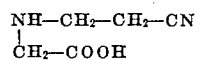

The low yield is accounted for by the solubility of the product in the alcohol-water mixture. Yields up to 80 percent are obtained by acidifying with acetic acid and employing a smaller volume of a more concentrated alcohol solution.

*Example 2*

N-bis(2-cyanoethyl)-glycine.—One mole (75.03 gm.) of glycine was shaken with 110 ml. of water, and 1 mole (40.0 gms.) of sodium hydroxide in 40 ml. water was added to give a clear aqueous solution of sodium glycinate. Two and one-tenth moles (144 ml.) of acrylonitrile were added and the reaction mixture allowed to stand over night at room temperature, after which it was heated for 2 hours at 50°–70° C. The reaction mixture was then acidified with 1 mole of hydrochloric acid to a pH of 3.3. The water was distilled off under the vacuum of a water pump and the dry residue taken up in 200 ml. of warm acetone. The sodium chloride was filtered off and washed with 100 ml. of acetone, the washings being added to the filtrate. The acetone was removed from the filtrate by aspiration and the dry residue dissolved in 200 ml. of warm isopropyl alcohol. After standing for 24 hours at 5° C., 38 gms. of crystals were filtered off. The filtrate was evaporated under vacuum to cloudiness and allowed to stand for 3 days at 5° C., after which 125 gms. of crystals were filtered off giving a total yield of 90 percent. Upon recrystallization, the melting point was 77.8–78.8° C. Analysis: calc.: C, 53.0; H, 6.07; N, 23.2; found: C, 52.8; H, 5.96; N, 23.16. The analysis agrees with the formula of N-bis(2-cyanoethyl)-glycine:

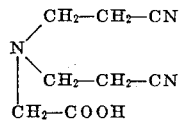

The pH of an aqueous solution containing 2½ percent of the product was 2.85. It is miscible with water, methyl and ethyl alcohol, acetone and dioxone. It is soluble to the extent of 6.6 percent in chloroform and 0.12 percent in ethyl ether.

*Example 3*

N-(2-cyanoethyl)-alanine.—One-fourth mole of the potassium salt of dl-alanine was prepared by shaking 22.27 gms. of dl-alanine with 200 ml. of water containing 0.25 mole of potassium hydroxide. One-fourth mole (16.4 ml.) of acrylonitrile was added and the mixture allowed to stand at room temperature for 24 hours with occasional shaking, after which it was held at 50° C. for 5 hours under reflux. The mixture was then acidified with 0.25 mole of hydrochloric acid. Two volumes of 95 percent ethanol were added and after standing overnight at 5° C., the crystals were filtered off. The crude crystals (30 gms.) were freed from potassium chloride by dissolving in 150 ml. water and adding 3 volumes of 95 percent ethanol to recrystallize. Fifteen and four tenths gms. of crystals were obtained having a melting point of 249°–250° C. with decomposition and a nitrogen content 19.44 agreeing with the formula for N-(2-cyanoethyl)-alanine:

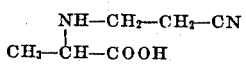

Additional crystals were obtained by reworking the filtrates.

Example 4

*N - bis(2 - cyanoethyl) - alanine.*—One-fourth mole, 22.27 gms. of dl-alanine was shaken with 250 ml. of water containing 10.0 gms. (0.25 mole) of sodium hydroxide to give a clear solution of sodium alaninate. Forty-one ml. (2.5 equivalents) of acrylonitrile were added and the mixture heated at 50° C. for 6 hours. The solution was then acidified with 1 equivalent of hydrochloric acid and evaporated to dryness under reduced pressure. The residue was extracted with 200 ml. of chloroform to remove the sodium chloride. The chloroform solution was allowed to evaporate at room temperature for three days yielding the first crop of crystals, weighing 25 gms. (51 percent yield). Upon recrystallizing twice from chloroform 16 gms. of the purified product was obtained giving a melting point of 74°–76° C. and Kjeldahl nitrogen of 21.32 percent agreeing with the formula for N-bis-(2-cyanoethyl)-alanine:

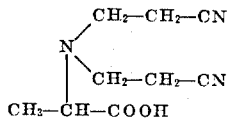

Example 5

*N-(2-cyanoethyl)-leucine.*—An aqueous solution of sodium leucinate was prepared by shaking 3.24 gms. of L (—) leucine with 50 ml. of water containing 1 equivalent of sodium hydroxide. One equivalent of acrylonitrile (1.615 ml.) was added and the mixture allowed to stand for 24 hours at room temperature with occasional shaking. One equivalent of hydrochloric acid was added whereupon voluminous crystallization occurred immediately. The mixture was cooled to 5° C. and filtered. After filtering and washing with cold water, 3.7 gms. (81.5 percent yield) of crystals which melted with decomposition at 240°–242° C. were obtained. Analysis: calc.: C, 58.7; H, 8.69; N, 15.2; found: C, 57.3; H, 8.49; N, 15.03. The analysis agreed with the formula for N-(2-cyanoethyl)-leucine:

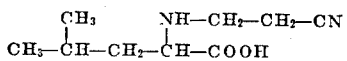

Example 6

*N - (2-cyanoethyl) - phenylalanine.*—Eight and twenty-six hundredths gms. (0.05 mole) of dl-phenylalanine were shaken with 150 ml. of water containing 0.05 mole of potassium hydroxide to give a clear solution of the potassium salt. Three and twenty-seven hundredths ml. (0.05 mole) of acrylonitrile were added and the mixture allowed to stand at room temperature, with occasional shaking for 2 days, after which it was acidified with 0.05 mole of hydrochloric acid. Voluminous crystallization occurred immediately. Upon centrifugation and washing with water 4.5 gms. of the product were obtained which melted with decomposition at 210°–212° C. and contained 12.25 percent nitrogen. Upon recrystallizing from hot 80 percent ethanol, 3.7 gms. (80 percent recovery) of the product were obtained melting at 228°–230° C. (with decomposition) and containing 12.32 percent nitrogen agreeing with the formula for N-(2-cyanoethyl)phenylalanine:

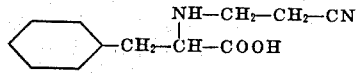

Example 7

*N -(2 - cyanoethyl) - tyrosine.*—A mixture containing 4.43 gms. L tyrosine, 50 ml. water, 1 equivalent of sodium hydroxide, and 2 equivalents of acrylonitrile was allowed to stand overnight and then acidified with 1 equivalent of hydrochloric acid. The insoluble precipitate was removed by centrifugation. The residue was slurried with 100 ml. water and recentrifuged, followed by slurrying with 100 ml. absolute ethanol and recentrifuging a second time. After drying for 6 hours in a vacuum oven at 70° C., 5.18 gms. (92 percent yield) of the product was obtained. It melted at 237°–239° C., with decomposition. Analysis: calc.: C, 61.4; H, 5.99; N, 11.95; found: C, 60.6; H, 5.97; N, 11.90. The analysis agrees with the formula for N-(2-cyanoethyl)-tyrosine:

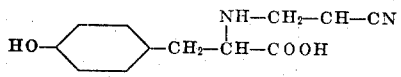

With tyrosine the monocyanoethyl derivative was obtained when the reaction was carried out at room temperature employing 1, 2 or 3 equivalents of acrylonitrile with either the mono- or di-sodium salt of tyrosine. With the di-sodium salt of tyrosine and 1 equivalent of acrylonitrile, a 96 percent yield of N-(2-cyanoethyl)-tyrosine was obtained. With 3 equivalents of acrylonitrile and the di-sodium salt of tyrosine, the yield dropped to 87 percent for the monocyanoethyl derivative. The difference was accounted for by formation of the dicyanoethyl derivative.

Example 8

*N-bis(2-cyanoethyl)-tyrosine.*—A mixture containing 4.43 gms. of L (—) tyrosine, 30 ml. water, 1 equivalent of sodium hydroxide and 3.5 equivalents of acrylonitrile was shaken at room temperature for 3 hours and then refluxed for 3 hours. The mixture was then acidified with 1 equivalent of dilute hydrochloric acid and centrifuged. The precipitate was washed with 200 ml. water and the washings added to the filtrate. The precipitate was washed with ethanol, the yield being 2.14 gms. of N-(2-cyanoethyl)-tyrosine.

The filtrate and washings were evaporated to dryness and the residue taken up with warm acetone. The sodium chloride was filtered off and the acetone volume reduced to incipient crystallization. After standing 3 days at 5° C., 2.1 gms. of needles were filtered off having a melting point of 123°–124° C. and a nitrogen content of 14.50 percent agreeing with the formula for N-bis(2-cyanoethyl)-tyrosine:

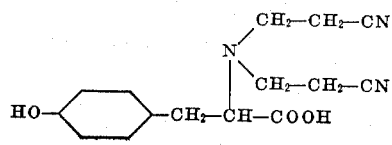

Example 9

*Dipotassium salt of N-(2-cyanoethyl)-aspartic acid.*—dl-Aspartic acid, 33.27 gms. (0.25 mole), was shaken with 300 ml. water containing 0.5 mole of potassium hydroxide to give a clear solution of the dipotassium salt. One-fourth mole (16.4 ml.) of acrylonitrile was added and the mixture refluxed for 2 hours. Analysis of an aliquot of the reaction mixture indicated that 96.5 percent of the acrylonitrile had reacted. The solution was then evaporated to dryness under reduced pressure and the dry salt was found to contain the following: C, 32.0; H, 3.2; N, 10.54; K, 28.75 percent, agreeing with the formula:

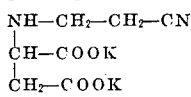

When the disodium salt of aspartic acid was used instead of the dipotassium salt, only 0.84 molecular equivalents of the acrylonitrile was found to react, leaving some free disodium aspartate with the product.

When the monosodium aspartate was employed, only 0.54 molecular equivalents of acrylonitrile was found to react.

Example 10

*N-bis-(2-cyanoethyl)-aspartic acid.*—dl-Aspartic acid, 33.27 gms. (0.25 mole), was shaken with 300 ml. of water containing 0.5 mole sodium hydroxide to give an aqueous solution of the disodium salt. Three equivalents (49.2 ml.) of acrylonitrile were added, and the mixture refluxed for 2 hours followed by shaking for 2 hours. Analysis of an aliquot of the reaction mixture, indicated that 1.92 equivalents of acrylonitrile had reacted. The solution was then neutralized with 2 equivalents of hydrochloric acid and evaporated to dryness under reduced pressure. The dry residue was washed on a Büchner funnel with 50 ml. of ice water to remove the sodium chloride leaving 24 gms. (77 percent yield) of the product which was recrystallized from 240 ml. of hot water (90 percent recovery). The melting point was 136°–137° C. Analysis: C, 50.0; H, 5.11; N, 17.55, agreeing with the formula for N-bis-(2-cyanoethyl)-aspartic acid:

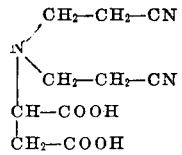

Example 11

*Dipotassium salt of N-(2-cyanoethyl)-glutamic acid.*—One-half mole (73.56 gms.) of L (+) glutamic acid was shaken with 400 ml. of water containing 1 mole of potassium hydroxide to give an aqueous solution of dipotassium glutamate. One-half mole (32.8 ml.) of acrylonitrile was added, and the mixture allowed to stand at room temperature with occasional shaking, for 3 days. The solution was evaporated to dryness under reduced pressure and the residue was found to contain C, 34.8; H, 3.67; N, 9.91; K, 27.0, agreeing with the formula for dipotassium-N-(2-cyanoethyl)-glutamate:

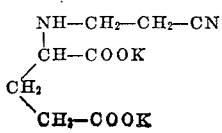

Example 12

*N-(2-cyanoethyl)-proline.*—Five and seventy-five hundredths gms. (0.05 mole) of L (−) proline was shaken with 100 ml. of water containing 1 equivalent of potassium hydroxide to give a solution of the potassium salt. Five ml. (0.076 mole) of acrylonitrile was added, and the mixture allowed to stand at room temperature with occasional shaking, for 2 days. One equivalent of hydrochloric acid was added and the solution evaporated to dryness under reduced pressure. The residue was taken up with 150 ml. of absolute ethanol and the potassium chloride filtered off. The product failed to crystallize from ethanol. The solution was evaporated to a syrup under reduced pressure and taken up with benzene and allowed to evaporate at room temperature whereupon a crop of crystals was obtained. Upon recrystallizing from hot acetone the product melted at 137°–140° C. and analyzed as follows: calc.: C, 57.1; H, 7.15; N, 16.67; found: C, 56.5; H, 6.95; N, 16.58. This analysis agrees with the formula for N-(2-cyanoethyl)-proline:

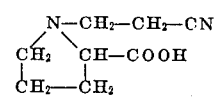

We claim:

1. A compound of the following structural formula:

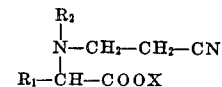

in which $R_1$ represents a member of the group consisting of aliphatic, araliphatic and aromatic radicals and is the residual group of an alpha-amino acid, the alpha-amino acid being one corresponding in structural formula to an alpha amino acid of a protein, $R_2$ represents a member of the group consisting of H and $CH_2$—$CH_2$—$CN$, and X represents a member of the group consisting of H and a cation.

2. A compound of the following structural formula:

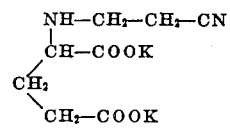

3. A compound of the following structural formula:

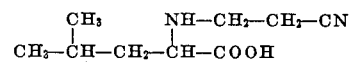

4. A compound of the following structural formula:

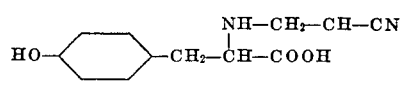

5. A compound of the following structural formula:

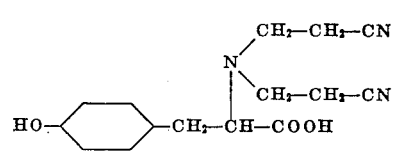

6. A process for producing an N-cyano ethyl substituted alpha amino acid, comprising reacting at least about one molecular equivalent of acrylic nitrile with an alpha amino carboxylic acid salt having an alpha $$-\overset{|}{\text{NH}}$$

group, the alpha amino carboxylic acid being one corresponding in structural formula to an alpha amino acid of a protein, substantially all of said alpha amino carboxylic acid and of the base corresponding to said cation being present in the form of said salt the cation of the salt being taken from the group consisting of the alkali metal ions, the alkaline earth metal ions, and the ammonium base ions, acidifying the resulting reaction mixture, and separating the thus formed N-(2-cyanoethyl) substituted alpha amino acid.

7. The process of claim 6 in which the cation is sodium.

8. The process of claim 6 in which the cation is potassium.

9. The process of claim 6 in which at least two molecular equivalents of acrylic nitrile are reacted, and separating the thus formed N-bis(2-cyanoethyl) substituted alpha amino acid.

10. The process of claim 6 in which the amino acid is tyrosine.

11. The process of claim 6 in which the amino acid is glutamic acid.

12. The process of claim 6 in which the amino acid is alanine.

13. The process of claim 6 in which the amino acid is aspartic acid.

14. A compound of claim 1 in which X is H.

15. A compound of the formula:

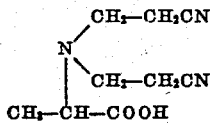

16. A process of producing $N-C_2H_4CN$ substituted leucine, comprising reacting at least about one molecular equivalent of acrylic nitrile with a leucine salt, the salt being a carboxylic acid salt, the cation of the salt being taken from the group consisting of alkali metal ions, the alkaline earth metal ions, and the ammonium base ions, acidifying the resulting reaction mixture, and separating the thus formed N-(2-cyanoethyl) leucine.

LEONARD L. McKINNEY.
JOHN C. COWAN.
EUGENE H. UHING.

REFERENCES CITED

The following references are of record in the file of this patent:

UNITED STATES PATENTS

| Number | Name | Date |
| --- | --- | --- |
| 1,992,615 | Hoffman et al. | Feb. 26, 1935 |
| 2,195,974 | Reppe et al. | Apr. 2, 1940 |

FOREIGN PATENTS

| Number | Country | Date |
| --- | --- | --- |
| 48,570 | France | Apr. 5, 1938 |
| | (3rd addition to 742,358) | |

OTHER REFERENCES

Scheibler et al.: Chem. Abst., vol. 20, p. 3283 (1926).

Karrer: Chem. Abst., vol. 36, col. 1051 (1942).

Cook et al.: J. Chem. Soc., vol. 1945, pp. 399–402.